United States Patent [19]

Wetzels

[11] 4,243,862
[45] Jan. 6, 1981

[54] ARC CUTTING DEVICE WITH MECHANICAL MATERIAL REMOVAL

[75] Inventor: Walter Wetzels, Eynatten, Belgium

[73] Assignee: Schumag GmbH, Aachen, Fed. Rep. of Germany

[21] Appl. No.: 949,150

[22] Filed: Oct. 6, 1978

[30] Foreign Application Priority Data

Oct. 14, 1977 [DE] Fed. Rep. of Germany ....... 2746241

[51] Int. Cl.³ .............................................. B23P 1/10
[52] U.S. Cl. ................................. 219/68; 204/129.46; 204/212; 219/69 E; 219/69 V
[58] Field of Search .................... 219/68, 69 V, 69 M, 219/69 E; 204/129.46, 212, 214

[56] References Cited

U.S. PATENT DOCUMENTS

| 1,701,919 | 2/1929 | Grumpelt | 219/69 V |
| 3,194,751 | 7/1965 | Brady | 204/212 |
| 4,140,598 | 2/1979 | Kimoto et al. | 204/129.46 |

FOREIGN PATENT DOCUMENTS

| 1108937 | 4/1968 | United Kingdom | 204/129.46 |
| 180275 | 7/1966 | U.S.S.R. | 219/69 E |
| 320359 | 3/1972 | U.S.S.R. | 219/69 M |
| 226747 | 4/1975 | U.S.S.R. | 219/69 M |

Primary Examiner—C. C. Shaw
Attorney, Agent, or Firm—Herbert L. Lerner

[57] ABSTRACT

Arc cutting device with a revolving electrode forming an intermittent arc includes a revolving narrow disc having a peripheral edge, part of which is electrically alive for forming the arc, and part of which is electrically dead for mechanically carrying away material that is to be removed from a cutting groove formed in a workpiece being cut by the arc.

23 Claims, 10 Drawing Figures

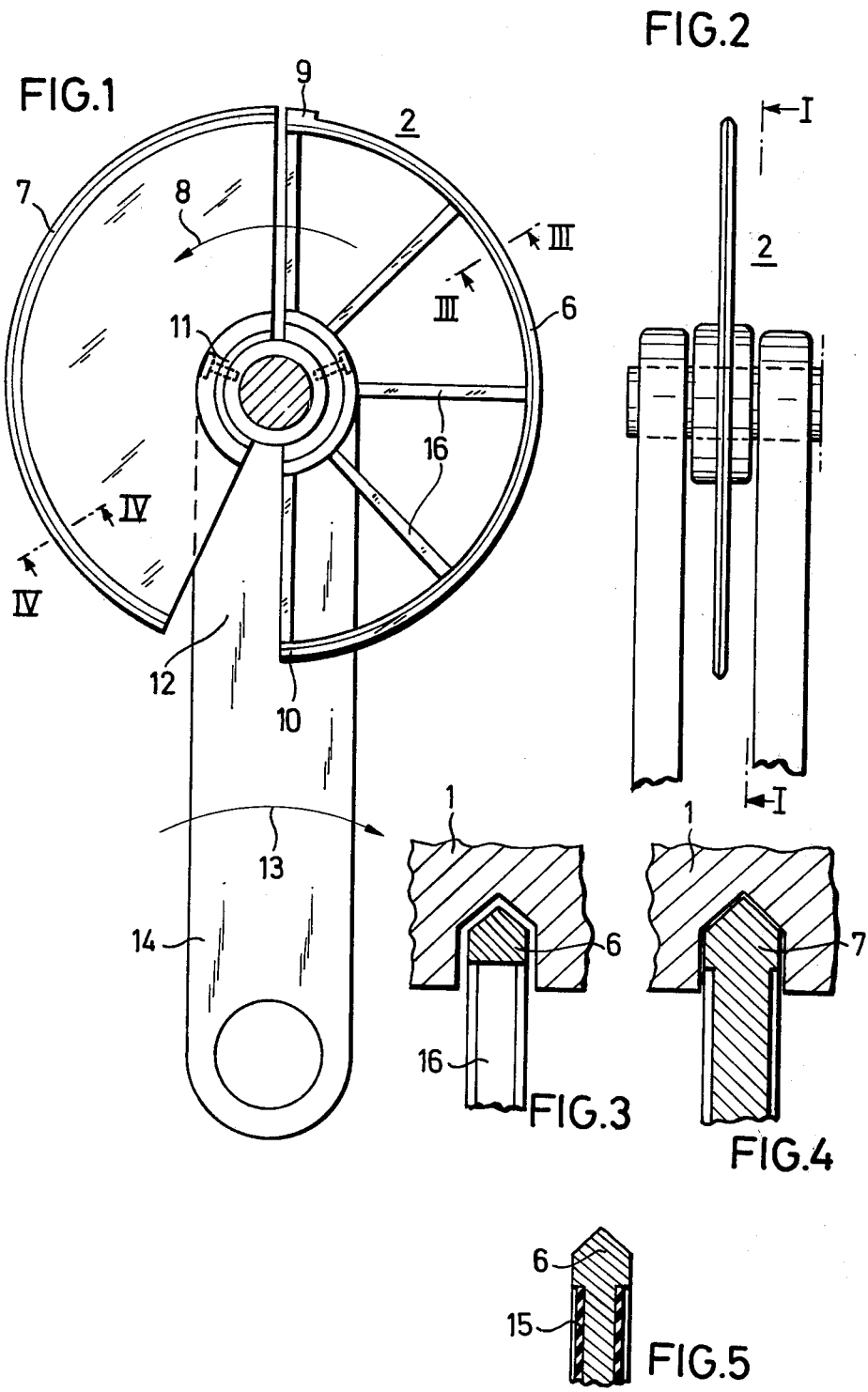

ARC CUTTING DEVICE WITH MECHANICAL MATERIAL REMOVAL

The invention relates to an arc cutting device having a revolving electrode with an intermittent arc and with mechanical removal of material to be taken away from a cutting groove.

From Swiss Pat. No. 113 954, an endless disc electrode revolving at high velocity has become known heretofore, wherein the periphery of the disc is toothed or serrated and is continuously directed against a workpiece. An electric arc is thereby progressively brought into effective operation upon metal that is to be cut. To intensify the arc, the disc has a step at one location. This heretofore known device has a disadvantage in that short circuits occur extensively between the electrode and the workpiece so that the effectiveness of the arc and the efficiency of the entire device are reduced.

From German Published Non-Prosecuted Application DE-OS No. 24 12 203, it has become known heretofore, to effect a controlled periodic voltage or current interruption in rhythm with the material-removal contact between the electrode and the workpiece. A disadvantage of this measure is that, at least for relatively long periods of operation, it has been found to be impossible to synchronize the periodic voltage or current interruption or switch-off sufficiently accurately with the contact rhythm or cycle. Consequently, with this heretofore known device, short circuits are again produced between the electrode and the workpiece, which reduce the effectiveness of the arc and the efficiency of the device.

It is accordingly an object of the invention to provide an arc cutting device of the foregoing general type wherein the arc becomes fully effective in the burning intervals that are provided, and the mechanical removal of the material to be taken away from the cutting groove occurs without any short circuits.

With the foregoing and other objects in view, there is provided, in accordance with the invention, an arc cutting device with a revolving electrode forming an intermittent arc comprising a revolving narrow disc having a peripheral edge, part of which is electrically alive for forming the arc, and part of which is electrically dead for mechanically carrying away material that is to be removed from a cutting groove formed in a workpiece being cut by the arc.

In accordance with another feature of the invention, the electrically dead parts of the peripheral edge of the disc, respectively, form, in themselves, mutually suspended sections.

In accordance with a further feature of the invention, the electrically alive and electrically dead parts of the peripheral edge of the disc are, respectively, formed of partial sections mutually alternating about the periphery of the disc.

In accordance with an added feature of the invention, respectively, between a trailing edge of one of the electrically alive sections and a leading edge of a next following electrically dead section, a gap adequate for breaking the arc is provided.

In accordance with an additional feature of the invention, the disc has a radius, respectively, in the region of the electrically alive section that is smaller, at a given arc length, than in the region of the electrically dead section.

In accordance with yet another feature of the invention, the disc has a radius, respectively, in the region of one of the electrically alive sections which decreases in peripheral direction by a length corresponding to a feed in radial direction between the disc and a workpiece to be cut.

In accordance with yet a further feature of the invention, the disc has a radius, respectively, in the region of one of the electrically dead sections which increases in length in peripheral direction in accordance with the amount of material to be removed at the respective section.

In accordance with yet an added feature of the invention, the edge of the disc, respectively, in the region of one of the electrically dead sections is wider than in the region of one of the electrically alive sections.

In accordance with yet an additional feature of the invention, the edge of the disc, respectively, in the region of one of the electrically dead sections is as wide as a zone of heated material that is cut from a workpiece and is to be removed.

In accordance with another feature of the invention, respectively, an electrically alive part in the region of one of the electrically alive sections has a radial extension adequate for formation of the arc.

In accordance with a further feature of the invention, the disc has sides formed with means for preventing arcing.

In accordance with an added feature of the invention, the means for preventing arcing comprise insulation at the sides of the disc.

In accordance with an additional feature of the invention, the insulation is formed of inorganic material.

In accordance with a more specific feature of the invention, the inorganic material is either ceramic or glass.

In accordance with an alternate feature of the invention, the insulation is formed of organic material.

In accordance with a more specific feature of the invention, the organic material is a heat-resistant synthetic material.

In accordance with a further feature of the invention, the means for preventing arcing comprise spokelike construction of the sides of the disc with interruptions therebetween.

In accordance with an added feature of the invention, the edge of the disc, respectively, in the region of one of the electrically alive sections is at least as wide as a remaining part of the disc.

In accordance with an additional feature of the invention, the device includes means for igniting an arc disposed, respectively, at a leading edge of one of the electrically alive sections.

In accordance with yet another feature of the invention, the arc-igniting means comprise, respectively, a radially extending contact projection at the leading edge for producing a breakdown spark.

In accordance with yet a further feature of the invention, the arc-igniting means comprise a controlled high-voltage ignition spark device.

In accordance with a concomitant feature of the invention, respectively, the electrically dead part of the peripheral edge of the disc has a shorter course of travel than the electrically alive part thereof.

The aforestated objects are fully accomplished with the foregoing device according to the invention. No additional, costly control devices are required for synchronizing the arc burn periods or intervals. Short circuits are reliably avoided, and the removal of the material to be carried away from the cutting groove can occur very effectively. The electrically alive part and the electrically dead part can thereby advantageously be provided with respectively different constructions in accordance with the different functions thereof.

Other features which are considered as characteristic for the invention are set forth in the appended claims.

Although the invention is illustrated and described herein as embodied in arc cutting device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is longitudinal sectional view of an embodiment of the arc cutting device according to the invention taken along the line I—I in FIG. 2;

FIG. 2 is a side view of the embodiment of FIG. 1;

FIG. 3 is an enlarged fragmentary sectional view of FIG. 1 taken along the line III—III;

FIG. 4 is a fragmentary sectional view of FIG. 1 taken along the line IV—IV and enlarged to the same scale as that of FIG. 3;

FIG. 5 is a fragmentary view of FIG. 3 showing a modified detail of the invention;

Figure 9:
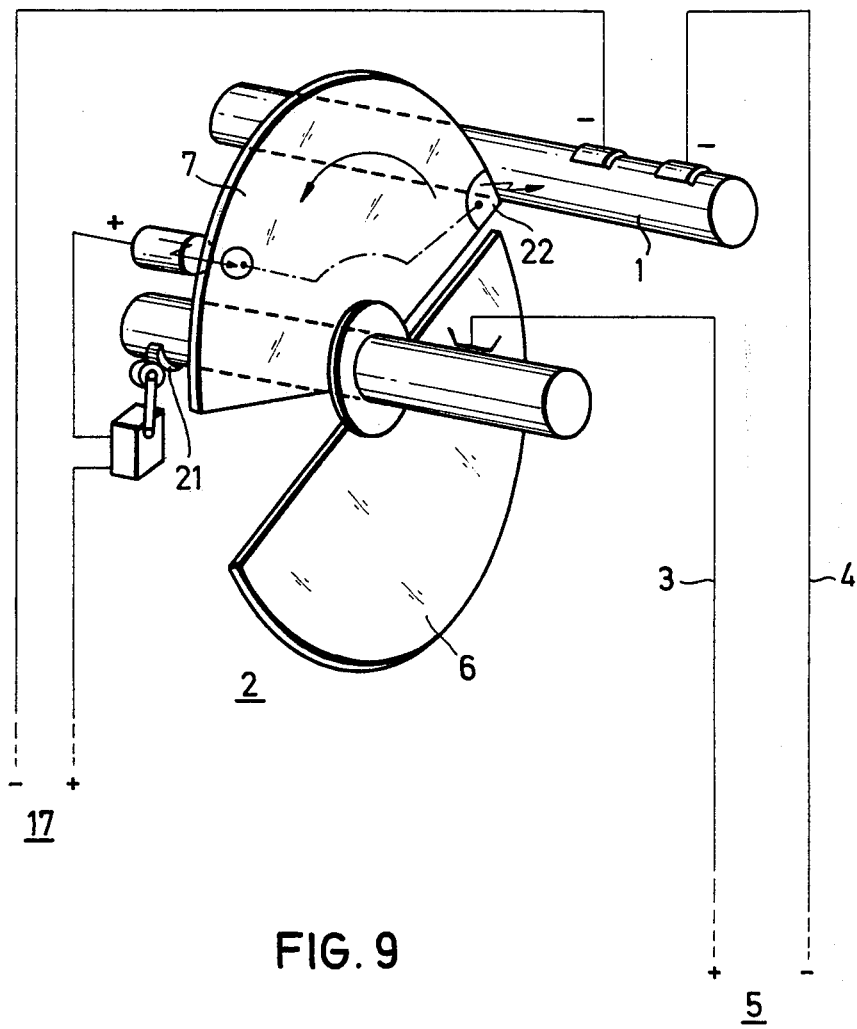
FIG. 9 is a partly schematic perspective view having the same scale as that of FIGS. 1, 2 and 6 of circuit details of the high-voltage spark ignition device according to FIG. 7.
Figure 10:
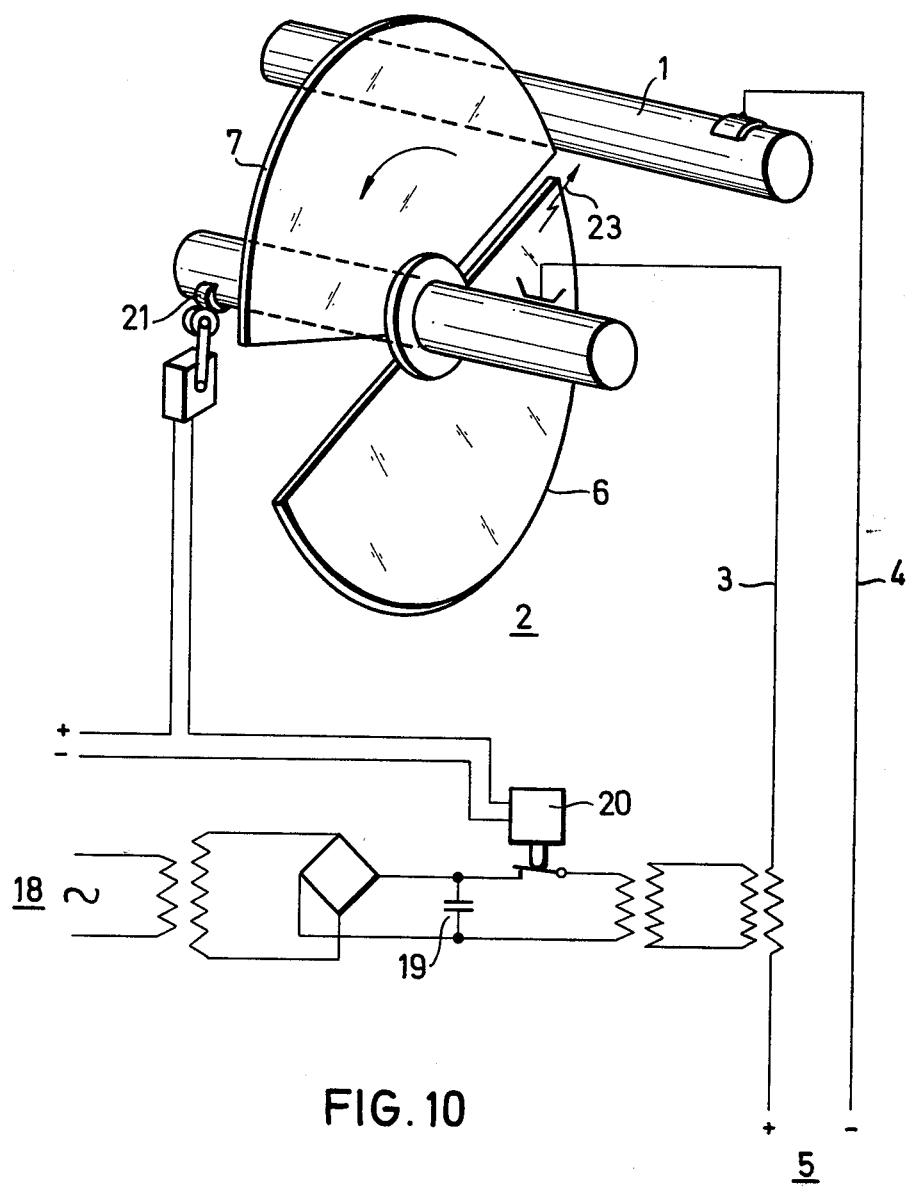
FIG. 10 is a view similar to that of FIG. 9 of circuit details of the high-voltage spark ignition device according to FIG. 8.

Referring now to the drawing and first, particularly, to FIGS. 1, 9 and 10 thereof, there is shown a workpiece 1 (FIGS 9 and 10) to be cut and a cutting disc 2 connected through lines 3 and 4 to a welding arc voltage source 5. The welding-arc voltage source 5 is preferably a direct-current supply of about 2 to 10 volt. In principle, an alternating-current source of corresponding voltage can also be used. Advantageously, the voltage of this voltage source is as inflexible or as steady as possible.

The cutting disc 2 has a part with a peripheral edge 6 that is voltage-conductive for the arc opposite the workpiece 1, and a part having a peripheral edge 7 that is not voltage-conductive for carrying away the material to be removed, respectively, from the cutting groove in the workpiece 1.

In the embodiment according to FIG. 1, the edge portions 6 and 7 respectively form for themselves mutually connected sections. In the embodiment according to FIG. 6, the edge portions 6' and 7' of the disc 2' are formed, respectively, of partial sections alternating one with the other. The disc 2' according to the embodiment of FIG. 6 is provided for a lower rotary speed than is the disc 2 of FIG. 1.

Figure 6:
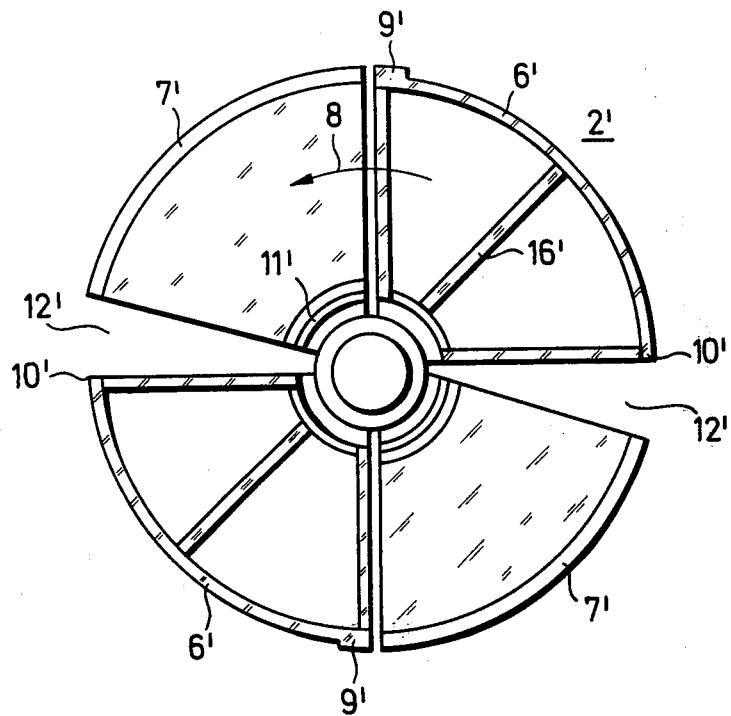
FIG. 6 is a view similar to that of FIG. 1 of another embodiment of the invention.

The discs 2 and 2', respectively, according to FIGS. 1 and 6, may rotate, respectively, in direction of the arrow 8. The rotary speed thereof is expediently relatively high. It may be 50 revolutions per second or more. The disc diameter is expediently about 300 mm. An advantageous disc material is expediently highly stable, heat-resistant steel.

Upon rotation of the cutting disc 2, 2', the contact projection 9, 9', respectively, comes into contact with the workpiece 1 briefly. Upon further rotation, a contact-breaking spark is formed, igniting the arc which develops between the workpiece 1 and the part of the section 6, 6' which is respectively, located opposite the workpiece 1. Inspite of the rotation of the cutting disc, the arc remains in the zone of the workpiece extension, and the section 6, 6' rotates away therebeneath. The voltage- or current-conductive section 6, 6' ends at the points 10 and 10', respectively, and the arc breaks off.

The voltage-nonconductive section 7, 7' is insulated from the respective voltage-conductive section 6, 6' by the insulation 11, 11'. The section 7, 7' may be formed of metal, like the section 6, 6'. So that the arc should reliably break off at the point 10, 10', respectively, and not pass over through the workpiece 1 to the section 7, 7', a gap 12, 12', respectively, is provided for adequately breaking off the arc.

With respect to the following, reference is made to FIGS. 3, 4 and 5. The disc radius in the section 6 is smaller for the arc length than the disc radius in the section 7. Also, the edge of the disc 2, respectively, in the section 6 is not as wide as that in the section 7. In this way, the arc in the section 6, can also develop over a given radial distance. This radial distance or range can be selected with due consideration being given to the best possible burning properties of the arc. In the section 7, on the other hand, a width is provided in accordance with the width of the zone of the heated material that is to be removed. Also the radius in the section 7 has a corresponding length.

The disc section 6, 6' and 7, 7' in accordance with FIGS. 3, 4 and 5, expediently has a triangular profile in order to provide the greatest possible heat withdrawal or removal. Other embodiments, such as a semicircle or a flat end, for example, are also possible.

It may also be expedient to provide the disc 7, 7' with a serrated toothing for improving the heat removal action.

The feed for cutting can be effected by moving the workpiece 1 or even more simply by pivoting a pivot arm 14 in direction of the arrow 13. Thereby, to maintain the arc constant, the disc radius in the section 6 can decrease in rotary direction by the amount of the feed. Furthermore, the disc radius, respectively, in the region of the section 7 can increase in rotary direction in accordance with the quantity of the material to be removed in this section 7.

In order for the arc in the section 6 to extend only at the provided edge portion, the sides of the disc 2, 2' under the section 6, 6' are, moreover, constructed so as to prevent arcing. According to FIG. 5, the sides of the disc 2, 2' are insulated by insulation 15. The insulation 15 may be formed of inorganic material, such as ceramic or glass, for example. Organic material, such as heat-resistant synthetic material, may, however, also be used therefor.

Another embodiment of the disc 2, 2' is illustrated in FIGS. 1, 3 and 6. In this type of construction, the disc 2, 2', in the section 6, 6' thereof, is formed spokelike with breaks or interruptions. Spokes 16, 16' may be formed of metal, and the arc-preventing effect thereof is that an arc or part thereof, which begins to creep along the spokes 16, 16' is quickly drawn out or elongated due to the rotation of the disc 2, 2' so that it breaks. In this manner, the arc in the spoke part 16, 16' is again extinguished before it is able to develop. The arc per se which serves for the cutting is not affected thereby. The spoke construction has the advantage that it is relatively simple and rugged or strong. Moreover, it is advantageous for the edge of the disc 2, 2', respectively, in the region of the section 6, 6' to be at least as wide as the remaining part of the disc 2, 2', in which regard reference is made also to FIGS. 3 and 5.

The following is noted with respect to FIGS. 7 to 10. Instead of the contact projection 9, 9', a controlled high-voltage ignition-spark device can be provided expediently for igniting the arcs. In that case, a controlled high voltage is briefly superimposed upon the cutting voltage of the welding generator, and permits an ignition spark to jump across from the disc 2, 2' to the workpiece 1.

Figure 7:
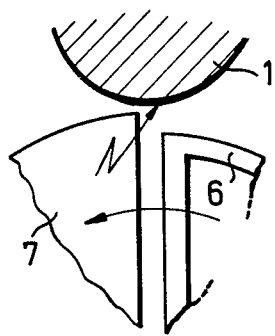
FIGS. 7 and 8 are enlarged fragmentary views of FIG. 1 in two different modes of operation thereof wherein arc ignition is shown effected by a controlled high-voltage spark ignition device.
Figure 8:
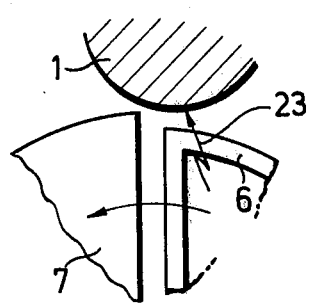

According to FIG. 9, the high-voltage source 17 is switchingly connected, respectively, by a switching cam and permits a spark to jump across to the disc part 7, the high-voltage current being conducted to a part 22 and permitting an ignition spark to jump across to the workpiece 1, as shown also in FIG. 7.

According to FIG. 10, and a-c source 18 (which may be ordinary line voltage) acts through a high-voltage transformer and a rectifier upon a loading capacitor 19. A switch 20 is actuated by the switching cam 21 and effects an oscillating discharge of the capacitor 19 which is superimposed upon the voltage of the welding-current source 5 and is thus delivered to the disc section 6. The spark 23 jumping across to the workpiece 1 ignites the arc as shown also in FIG. 8.

By means of the switching cam 21 revolving with the disc 2, the instant of ignition can be established very accurately both for the embodiment according to FIG. 9 as well as for the embodiment according to FIG. 10, without requiring any complex controls in addition thereto.

From FIGS. 1, 6, 9 and 10, it is apparent that, respectively, the dead or nonvoltage-carrying part 7, 7' at the periphery of the disc 2, 2' has a shorter course or travel distance than the live or voltage-carrying part 6, 6'. In this way, the effective period or duration of the arc is lengthened. Thus, an harmonic relationship can be produced between the action of the arc and the removal action in the section 7.

All of the features which are described hereinbefore and/or shown in the drawing, taken by themselves or in any combination or partial combination thereof, are considered to be within the scope of the invention, as generally noted hereinbefore.

There is claimed:

1. Arc cutting device with a revolving electrode forming an intermittent arc with a workpiece for cutting a groove therein, comprising a revolving narrow disc having a peripheral edge, at least one part of said peripheral edge being on a portion of said disc which is electrically alive for forming the arc, and at least another part of said peripheral edge being on a portion of said disc which is electrically dead for mechanically carrying away material that is to be removed from the cutting groove formed in the workpiece being cut by the arc.

2. Device according to claim 1 wherein said electrically alive and electrically dead portions of said disc, respectively, form, in themselves, mutually suspended sections.

3. Device according to claim 1 wherein said electrically alive and electrically dead portions of said disc are, respectively, formed of a plurality of partial electrically alive and electrically dead sections mutually alternating about the periphery of the disc.

4. Device according to claim 3 wherein, respectively, between a trailing edge of one of said electrically alive sections and a leading edge of a next following electrically dead section, a gap adequate for breaking the arc is provided.

5. Device according to claim 4 wherein said disc has a radius, respectively, in the region of said electrically alive section that is smaller, at a given arc length, than in the region of said electrically dead section.

6. Device according to claim 5 wherein said disc and the workpiece are relatively feedable toward one another, and wherein said disc has a radius, respectively, in the region of one of said electrically alive sections which decreases in peripheral direction by a length corresponding to a feed in radial direction between said disc and a workpiece to be cut.

7. Device according to claim 5 wherein said disc has a radius, respectively, in the region of one of said electrically dead sections which increases in length in peripheral direction in accordance with the amount of material to be removed at the respective section.

8. Device according to claim 7 wherein said edge of said disc, respectively, in the region of one of said electrically dead sections is wider than in the region of one of said electrically alive sections.

9. Device according to claim 8 wherein said edge of said disc, respectively, in the region of one of said electrically dead sections is as wide as a zone of heated material that is cut from a workpiece and is to be removed.

10. Device according to claim 9 wherein, respectively, an electrically alive part in the region of one of said electrically alive sections has a radial extension adequate for formation of the arc.

11. Device according to claim 1 wherein said disc has sides formed with means for preventing arcing.

12. Device according to claim 11 wherein said means for preventing arcing comprise insulation at said side of said disc.

13. Device according to claim 12 wherein said insulation is formed of inorganic material.

14. Device according to claim 13 wherein said inorganic material is either ceramic or glass.

15. Device according to claim 12 wherein said insulation is formed of organic material.

16. Device according to claim 15 wherein said organic material is a heat-resistant synthetic material.

17. Device according to claim 11 wherein said means for preventing arcing comprise spokelike construction of said sides of said disc with interruptions between the spokes thereof.

18. Device according to claim 3 wherein said edge of said disc, respectively, in the region of one of the electrically alive sections is at least as wide as a remaining part of the disc.

19. Device according to claim 4 including means for igniting an arc disposed, respectively, at a leading edge of one of said electrically alive sections.

20. Device according to claim 19 wherein said arc-igniting means comprise, respectively, a radially extending contact projection at said leading edge for producing a breakdown spark.

21. Device according to claim 19 wherein said arc-igniting means comprise a controlled high-voltage ignition spark device.

22. Device according to claim 1 wherein, respectively, said electrically dead part of said peripheral edge of said disc has a shorter course of travel than said electrically alive part thereof.

23. Device according to claim 1 wherein said electrically alive and electrically dead portions of said disc are, respectively, formed of a partial radial section of the disc, each section including part of the peripheral edge of the disc.

* * * * *